United States Patent [19]

Bessho et al.

[11] Patent Number: 4,632,803

[45] Date of Patent: Dec. 30, 1986

[54] OPERATING METHOD OF BOILING WATER REACTOR

[75] Inventors: Yasunori Bessho, Hitachi; Sadao Uchikawa, Katsuta; Motoo Aoyama, Hitachi, all of Japan

[73] Assignee: Hitachi, Ltd., Tokyo, Japan

[21] Appl. No.: 529,760

[22] Filed: Sep. 6, 1983

[30] Foreign Application Priority Data

Sep. 6, 1982 [JP] Japan .................... 57-155044

[51] Int. Cl.⁴ .................................... G21C 7/06
[52] U.S. Cl. .................................... 376/238; 376/236
[58] Field of Search ............... 376/236, 237, 238, 370, 376/419, 447

[56] References Cited

U.S. PATENT DOCUMENTS

| | | | |
|---|---|---|---|
| 3,565,760 | 2/1971 | Parkos et al. | 376/217 |
| 4,075,059 | 2/1978 | Bruno et al. | 376/238 |
| 4,108,720 | 8/1978 | Sato et al. | 376/210 |
| 4,129,475 | 12/1978 | Spurgin et al. | 376/238 |
| 4,181,569 | 1/1980 | Ingham | 376/238 |
| 4,285,769 | 8/1981 | Specker et al. | 376/237 |

FOREIGN PATENT DOCUMENTS

| | | | |
|---|---|---|---|
| 54-35595 | 3/1979 | Japan | 376/236 |
| 54-35594 | 3/1979 | Japan | 376/236 |

*Primary Examiner*—David H. Brown
*Assistant Examiner*—Richard W. Wendtland
*Attorney, Agent, or Firm*—Antonelli, Terry & Wands

[57] ABSTRACT

In the operation of a boiling water reactor, when the core flow rate is decreased due to a trip of the circulating pump, the control rod pattern is suitably changed to avoid unnecessary scram of the control rods. The change of the control rod pattern is made by driving control rods which have been inserted to small depth deeper into a depth near 12/24 of the core height. In addition to this control rod operation, the control rods which have been inserted to large depth are withdrawn to a depth near 12/24 or, alternatively, the control rods which have not been inserted at all are inserted to the depth of about 12/24 of the core height.

4 Claims, 9 Drawing Figures

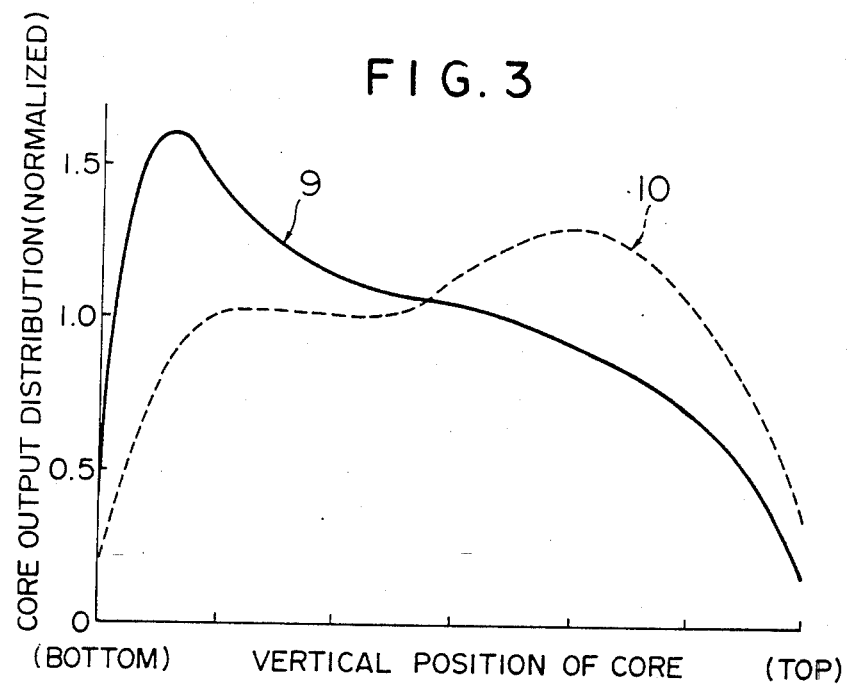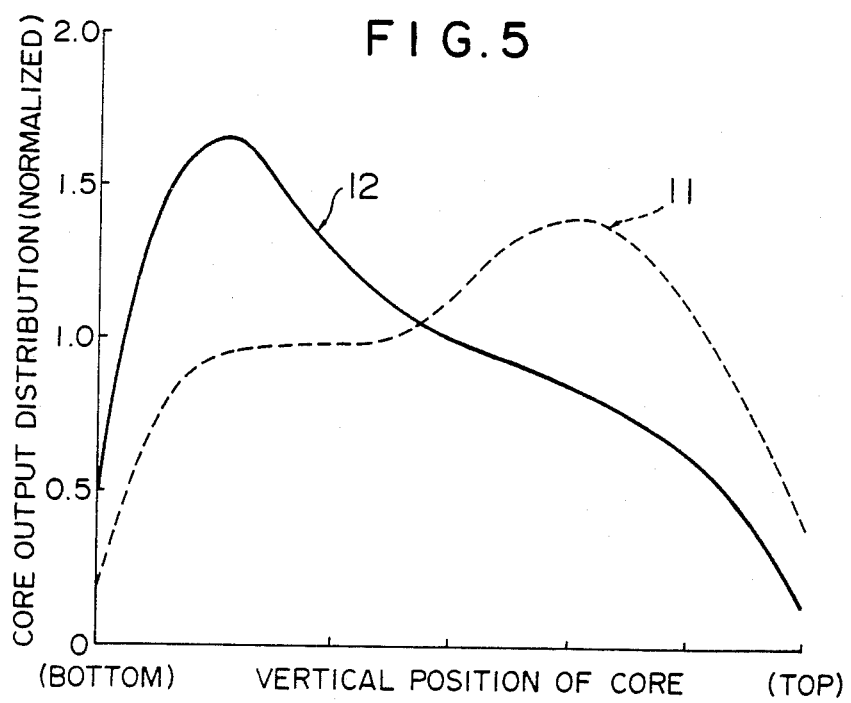

OPERATING METHOD OF BOILING WATER REACTOR

BACKGROUND OF THE INVENTION

The present invention relates to an operating method of a boiling water reactor and, more particularly, to an operating method of a boiling water reactor in the event that the flow rate of coolant through the core (referred to as "core flow rate", hereinunder) is decreased due to, for example, a trip of the circulating pump.

The specifications of U.S. Pat. Nos. 4,108,720 and 3,565,760 disclose operating methods of nuclear reactors. During operation of a nuclear reactor in accordance with these methods, when the core flow rate is decreased accidentally due to a trip of the circulating pump, a high core output is maintained despite of the reduced core flow rate so that a nuclear-hydrothermally unstable condition is caused in the nuclear reactor. Hitherto, in order to avoid such an unstable condition, it has been a common measure to stop the operation by a scram or to continue the operation with reduced output by inserting preselected control rods, when the circulating pump is tripped.

SUMMARY OF THE INVENTION

Accordingly, it is a primary object of the invention to provide an operating method of a nuclear reactor, capable of preventing a nuclear-hydrothermally unstable condition in the nuclear reactor, without requiring stopping by scram or a drastic reduction of output by insertion of control rods.

To this end, according to the invention, there is provided a method of controlling the operation of a boiling water reactor comprising: driving, when the core flow rate is decreased due to a trip of the circulating pump, the control rods to change the control rod pattern from the pattern intended for the output control during rated operation to a pattern which provides such an output distribution that a higher output is obtained in the upper core portion than in the lower core portion.

By the control rod operation explained above, it is possible to decrease the change of output at the lower portion of the core even when the output distribution is changed by a disturbance, thereby to prevent substantial change in the position of commencement of the boiling. In consequence, the changes in the pressure loss in the assembly channel and the coolant flow rate, as well as changes in the amount of voids and core nuclear characteristics, are diminished. Thus, the influence of the disturbance is rapidly attenuated to improve the nuclear-hydrothermal stability over the whole portion of the reactor core.

The following control rod operation is conducted to realize the output distribution in which the core output is higher in the upper core portion than in the lower core portion.

(1) One or more of the control rods, which have been fully withdrawn or inserted to a depth not greater than 12/24 of the core height, are driven into the depth not smaller than 3/24 but not greater than 12/24. For instance, the control rod or rods which have been inserted to the depth of 4/24 of the core height are driven to the depth of 6/24 of the core height.

The control rod operation (1) explained above may be used solely or in combination with the following control rod operation (2).

(2) To extract one or more control rods which have been inserted to the depth not smaller than 12/24 of the core height.

The following results are obtained through the above-explained control rod operations (1) and (2).

(a) By inserting the control rods which have been fully withdrawn, it becomes possible to control the output distribution along the fuel assemblies which have not been under the output control. In addition, since the insertion depth is selected to be not smaller than 3/24 but not greater than 12/24, it is possible to diminish the output peak which tends to appear in the lower core portion, i.e. in the portion of the commencement of boiling.

(b) By inserting the control rods from the depth of 12/24 of core height or smaller to a depth not smaller than 3/24 but not greater than 12/24, the output peak in the lower core portion can be lowered.

(c) Generally, the control rods inserted to the depth not smaller than 13/24 are used mainly for the reactivity control and are effective in shifting the output distribution over the core to the lower side of the core. Therefore, withdrawal of one or more of such control rods increases the output at the ends of the control rods to realize such an output distribution that the output is higher in the upper core portion than in the lower core portion.

(d) The insertion of the control rods to the depth greater than 12/24 is not preferred because such control rod operation produces an output distribution in which the output level is higher in the lower core portion than in the upper core portion.

In order to realize an output distribution having no substantial peak in the lower core portion without being accompanied by any change in the output level despite the control rod operation, it is possible to make simultaneous use of the control rod operations (1) and (2) so as to negate the changes in the reactivity. Namely, the control rods which have been inserted to large depth are withdrawn while the control rods which have been withdrawn or inserted only to a small depth are driven deeper. In order to minimize the amount of the control rod operation to facilitate the control of operation of the nuclear reactor, the control rod operation may be such that the control rods withdrawn from the depth greater than 13/24 of the core height still remain at the depth not smaller than 13/24 and that the control rods inserted from the fully withdrawn position or from depth smaller than 12/24 still remain within the depth not greater than 12/24 of the core height.

The boiling water reactor is usually controlled in accordance with a control rod operation pattern which is determined so as to maintain an output distribution having no output peak in the upper core portion, from the view point of a long-term running of reactor over several months. The operation control method of the invention may temporarily create such an output distribution as having greater concentration of output in the upper core portion. Such an output distribution, however, can last only one day or so at the longest and, hence, does not cause any substantial problem from the view point of the long-term operation plan.

BRIEF DESCRIPTION OF THE DRAWINGS

FIG. 3 is a graph showing a core output distribution as attained by the operation controlling method of the first embodiment of the invention in comparison with that obtained through a conventional operation controlling method;

FIG. 5 is a graph showing the core output distribution as obtained by the operation controlling method of the second embodiment in comparison with that obtained through a conventional operation controlling method.

DESCRIPTION OF THE PREFERRED EMBODIMENT

A first embodiment of the invention will be described hereinunder with specific reference to FIGS. 1 to 3. The description will refer to a boiling water reactor having a rated operation at a rated core heat output of 3845 MWt and a rated core flow rate of 52073 t/hr, by way of example.

Figure 1:
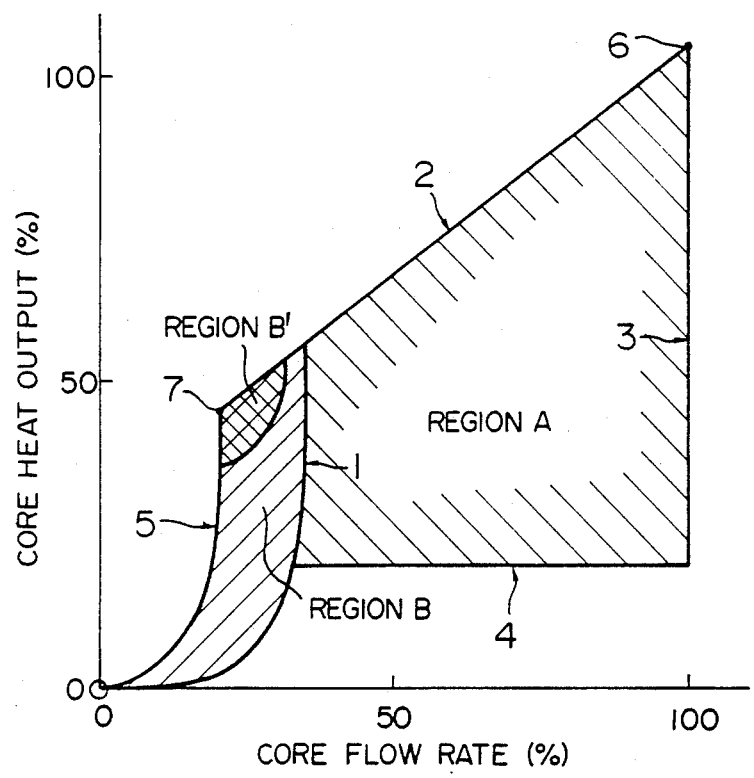
FIG. 1 shows operation regions of a boiling water reactor on a map showing the relationship between the core flow rate and core heat output.

FIG. 1 shows the regions of operation of the boiling water reactor in a coordinate in which the axis of abscissa represents the core flow rate level (%), i.e. the ratio of the actual core flow rate to the rated core flow rate while axis of ordinate represents the core heat output level (%), i.e. the ratio of the actual core heat output to the rated core heat output. In this Figure, a curve designated at numeral 1 is the minimum pump speed curve showing the relationship between the core heat output and the core flow rate as attained when the circulating pump is operated at the minimum speed (up to 20%) allowed by the design, while a curve denoted by numeral 2 is a rod block line showing the limit of withdrawal of the control rods. The vertical line 3 is the maximum flow rate curve which shows the relationship between the core flow rate and the core heat output as attained when the circulating pump is operated at the maximum speed allowed by design, i.e. at 100% speed. A line denoted by numeral 4 is the cavitation line. Operation in the region below this line is not preferred because of possibility of cavitation around the pump impeller.

Thus, a region A defined by the minimum pump speed line 1, rod block line 2, maximum flow rate line 3 and the cavitation line 4 is the region of normal reactor operation with normal operation of the circulating pump. In the case of, for example, a trip of the circulating pump, it is allowed to operate the reactor within the region B defined by a natural circulation curve 5, rod block line 2 and the minimum pump speed curve 1, in which the core flow rate depends primarily on the natural circulation.

The region B' in which the core heat output to core flow rate ratio (output/flow rate) takes a large value suffers the inferior stability, i.e. small margin of the stability. This is attributable to a high mean voidage in the reactor core and also to a large pressure loss due to two-phase flow.

Figure 2A:
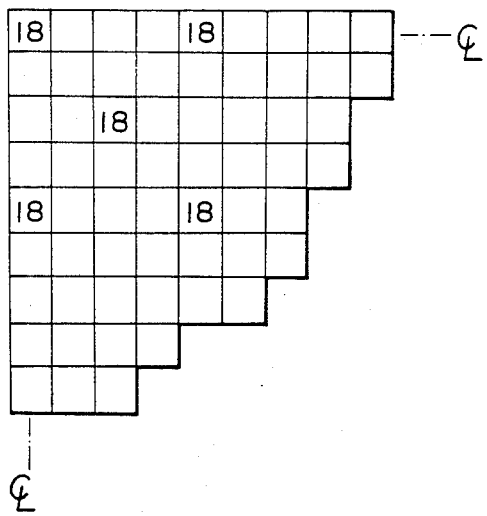
FIGS. 2a to 2c are illustrations of a first embodiment of the operation controlling method in accordance with the invention.

The control rod operation pattern shown in FIG. 2a has been set up beforehand on the basis of the rated output from the view point of long-term reactor core operation. The control rod operation pattern is shown only for a quarter of the reactor core, for the clarification of the drawings. The numerical values appearing in each frame represents the insertion depth in terms of 1/24 of the core height. Namely, numeral "24" represents the full insertion, while "0" or blank means full withdrawal of the control rod.

When the circulating pump is tripped under this control rod operation pattern, the reactor core is made to operate along the natural circulation curve 5 in FIG. 1. In such a case, the output distribution has a large peak in the lower core portion as shown by a curve 9 in FIG. 3. The core flow rate and the core heat output are about 23% and about 47% under this condition, respectively. The decay ratio is 0.85.

The decay ratio represents the nuclear-hydrothermally stability of the nuclear reactor, that is, indicates how quickly the output returns the ordinary state after a disturbance such as a pressure change occurs. The decay ratio can be generally defined as a ratio of an amplitude of the second wave of the output fluctuation to an amplitude of the first wave thereof.

Figure 2B:
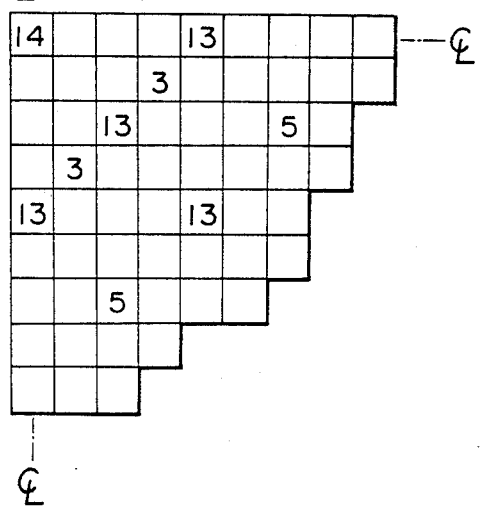
Figure 2C:
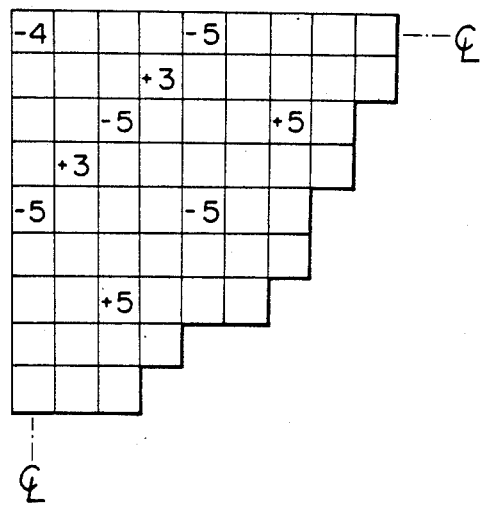

FIG. 2b shows the control rod operation pattern after the control in accordance with the invention. This control rod pattern is realized by effecting a control rod operation shown in FIG. 2c on the control rod operation pattern shown in FIG. 2a, when the core flow rate has come down below 45% of the rated core flow rate and the core heat output has been decreased to under 62% of the rated output under. In FIG. 2c, the positive and negative symbols show, respectively, the driving of the control rods to greater and smaller depths.

When the reactor core is operated along the natural circulation curve under this control rod operation pattern, the output distribution shows a peak value of 1.30 at the height of 16/24 of the core height, as will be seen from curve 10 in FIG. 3. In this state, the core flow rate is about 23% while the core heat output is about 47% so that the decay ratio is decreased to 0.61 which is about 28% improvement as compared with that attained before the execution of control shown in FIG. 2c.

In the described embodiment of the invention, the control rod operation pattern is determined in accordance with a rule to minimize the amount of operation of the control rods. Namely, the control is made in such a way that the control rods which have been inserted to the depth greater than 13/24 still remain within the range of insertion depth not smaller than 13/24 even after the operation, and the control rods which have been fully withdrawn remains at small insertion depth not greater than 12/24 of the core height, whereby the control rod operation is facilitated considerably. It is advisable that the control rods obliquely neighbouring the control rods which have been inserted to large depth are selected as the control rods which are to be inserted newly from the fully withdrawn position.

The amount of operation of the control rods may be determined as follows, although it may be calculated beforehand by off-line computation. The newly inserted control rods are inserted to a depth of 3/24 of the core height thereby to reduce the level of the heat output in the lower core portion. Thereafter, the control rods which have been inserted to a large depth are withdrawn to a depth of about 14/24 to further decrease the level of the output in the lower core portion. Then, the amount of insertion of the control rods is adjusted by the operator while observing the output distribution through a core performance observation system so as not to allow the formation of large peak in the lower core portion.

In some cases, it is desired that the level of the heat output under low core flow rate in the control rod operation pattern shown in FIG. 2b, attained by the operation control of the invention, is substantially equal to the heat output level obtained with the pattern shown in FIG. 2a before the operation control. To cope with such a demand, it is advisable to determine the amount of insertion of the control rods so as to uniformalize the ratio of the control rods inserted into the reactor core, although the insertion amount varies depending on various factors such as positions of the control rods, insertion depths before the control and the condition of the reactor core.

A second embodiment of the invention, applied to a boiling water reactor of rated operation at a rated core heat output of 2381 MWt and core flow rate of 33340 t/hr, will be described hereinunder with specific reference to FIGS. 4a to 4c and FIG. 5.

Figure 4A:
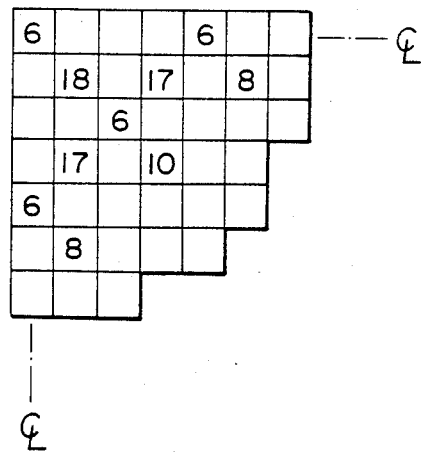
FIGS. 4a to 4c are illustrations of a second embodiment of the operation controlling method of the invention.
Figure 4B:
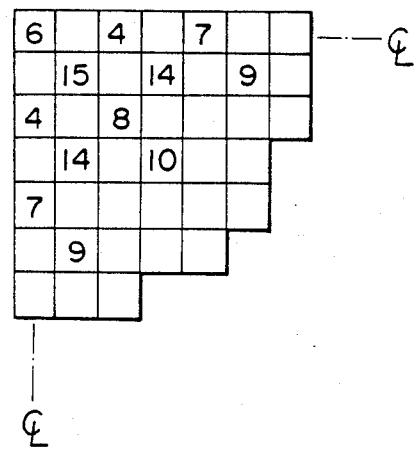
Figure 4C:
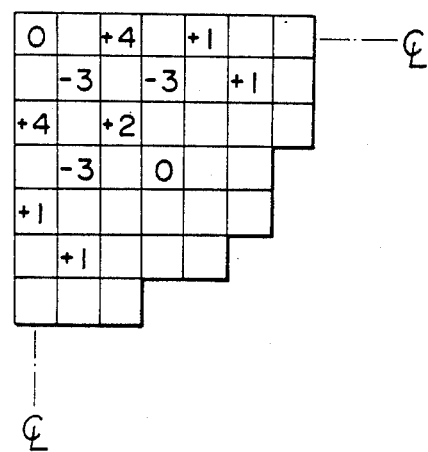

FIG. 4a shows a control rod operation pattern which has been determined beforehand from the view point of long-term operation of the reactor core. As shown by a curve 12 in FIG. 5, the power distribution along the natural circulation line (core heat output 49%, core flow rate 26%) in this control rod operation pattern has a peak value of 1.68 at a position located at a level 5/24 of the core height from the bottom of the core. In this state, the decay ratio takes a value of 0.68. FIG. 4b shows the control rod operation pattern attained after the operation control in accordance with the invention. This control rod operation pattern is obtained by effecting a control as shown in FIG. 4c on the pattern shown in FIG. 4a, when the core flow rate has come down below 40% of the rated flow rate while the core heat output has been decreased to under 58% of the rated output. In the control rod operation pattern shown in FIG. 4b attained through the operation control of the invention, the core heat output is about 50% and the core flow rate is about 26% of the rated values. As will be seen from a curve 11 in FIG. 5, the power distribution has a peak value of 1.40 at a position located at the level of 17/24 of the core height from the bottom of the core. The decay ratio in this state takes a value of 0.48 which amounts to about 21% improvement as compared with that in the state shown in FIG. 4a.

The difference between the first and second embodiments resides in the control rod operation pattern which is determined from the view point of long-term operation of the reactor core. Namely, in the first embodiment explained in connection with FIG. 2a, only the control rods which have been inserted to large depth are used in the operation control, whereas, in the second embodiment explained in connection with FIG. 4a, both of the control rods inserted to large depth and control rods inserted to small depth take part in the operation control. It will be understood, however, that the control of the operation is conducted by employing the aforementioned methods (1) and (2) in either embodiment.

The predicted core flow rate and core heat output at which the control rod operation in accordance with the controlling method of the invention is commenced vary depending on the nature of the nuclear reactor, and can be determined by various suitable ways. For instance, it is possible to determine the core flow rate and core heat output such that the decay ratio is converged around 0.5, through an off-line stability analysis.

What is claimed is:

1. A method of controlling an operation of a boiling water reactor having a core heat output thereof controlled by operating control rods to insert or withdraw the control rods and by regulating a core flow rate delivered by a circulating pump without effecting shutdown of the reactor comprising the steps of:

inserting, when the core flow rate is decreased due to a trip of the circulating pump, at least one control rod, which has been fully withdrawn or inserted to a depth smaller than 12/24 of a core height, to a depth not smaller than 3/24 and not greater than 12/24 of the core height; and withdrawing, when the core flow rate is decreased due to a trip of the circulating pump, at least one control rod, which has been inserted to a depth greater than 13/24 of the core height, to a depth not smaller than 13/24 of the core height.

2. A method of controlling an operation of a boiling water reactor according to claim 1, wherein, when the core flow rate has come down below a predetermined core flow rate value while the core heat output has been decreased below a predetermined output value, at least one of the control rods which has been fully withdrawn or inserted to a depth smaller than 12/24 of the core height is inserted to a depth not smaller than 3/24 but not greater than 12/24 of the core height.

3. A method of controlling an operation of a boiling water reactor according to claim 1, wherein when the core flow rate has come down below a predetermined value while the core heat output has been decreased below a predetermined value, at least one of the control rods which has been inserted to a depth greater than 13/24 of the core height is withdrawn to a depth not smaller than 13/24 of the core height.

4. A method of controlling an operation of a boiling water reactor according to claim 1, in which said inserting and withdrawing steps are conducted when the core flow rate is decreased to a value below a predetermined value due to a trip of the circulating pump.

* * * * *